United States Patent [19]

Normark

[11] 4,328,980
[45] May 11, 1982

[54] COUPLING BETWEEN MECHANICAL ELEMENTS

[76] Inventor: Olov M. Normark, Astrakangatan 2, Vällingby, Sweden, S-162 32

[21] Appl. No.: 186,962

[22] Filed: Sep. 15, 1980

Related U.S. Application Data

[63] Continuation of Ser. No. 956,431, Oct. 31, 1978, abandoned.

[30] Foreign Application Priority Data

May 4, 1977 [SE] Sweden .................................. 7705193

[51] Int. Cl.³ ............................................. F16L 19/00
[52] U.S. Cl. ..................................... 285/341; 285/343
[58] Field of Search ............. 285/341, 342, 343, 382.7

[56] References Cited

U.S. PATENT DOCUMENTS

| | | | |
|---|---|---|---|
| 2,351,363 | 6/1944 | Parker et al. | 285/382.7 X |
| 2,480,496 | 8/1949 | Mercier | 285/382.7 X |
| 2,547,889 | 4/1951 | Richardson | 285/343 |
| 2,640,716 | 6/1953 | Bigelow | 285/382.7 X |
| 3,214,200 | 10/1965 | Carlson et al. | 285/382.7 X |

FOREIGN PATENT DOCUMENTS

| | | | |
|---|---|---|---|
| 1475764 | 3/1969 | Fed. Rep. of Germany | 285/341 |
| 1233372 | 5/1971 | United Kingdom | 285/382.7 |

*Primary Examiner*—Thomas F. Callaghan
*Attorney, Agent, or Firm*—Holman & Stern

[57] ABSTRACT

A coupling, arranged to form a frictional joint between two mechanical elements, comprising a tubular contact member, arranged to take up a non-deformative frictional contact with an element to be attached by means of a first peripherical surface when force transforming ring having a conical contact surface is moved against a co-acting conical contact surface at the opposed peripherical surface of the contact member by means of a manually operated and linearly movable force applying member, thereby applying a force at one point along said surface of the contact member, said contact member being arranged with such a longitudinal section that the force applied at one point by the force transforming ring is equally distributed along the surface in contact with the member to be attached.

4 Claims, 7 Drawing Figures

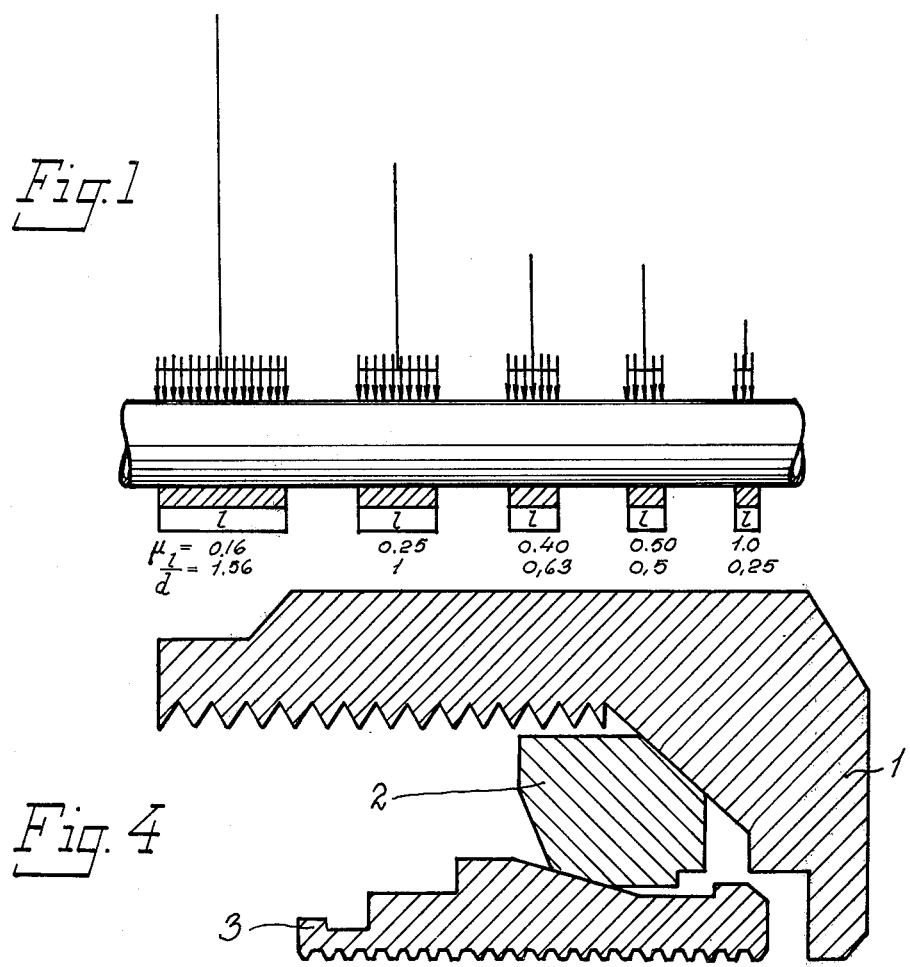
Fig. 1
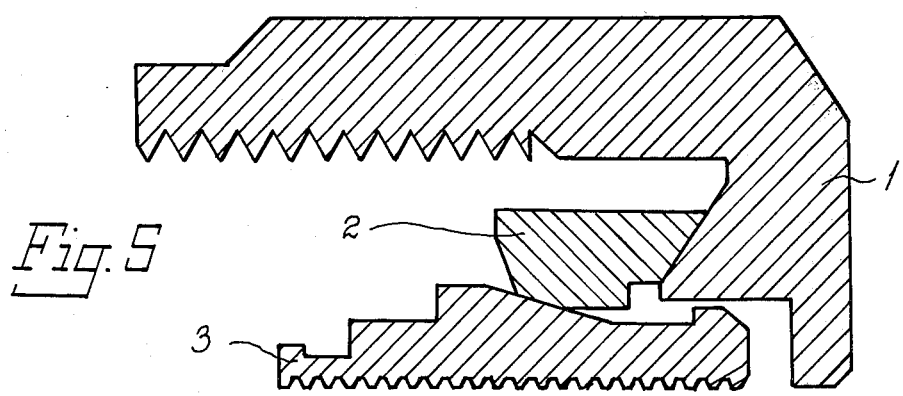
Fig. 4
Fig. 5

COUPLING BETWEEN MECHANICAL ELEMENTS

This is a continuation of application Ser. No. 956,431, filed Oct. 31, 1978, and now abandoned.

BRIEF SUMMARY OF THE INVENTION

The present invention relates to a coupling between mechanical elements, and the term mechanical elements includes elements having a solid or tubular cross-sectional area, and also semi-solid cross-sectional area, e.g. wires or similar.

A large number of different types of couplings or joints are previously known, intended to facilate joining of two elements, such as permanent joints, e.g. by means of welding, and also as various types of couplings and other non-permanent joints, e.g. various types of tubular couplings, axle attachments, locking means for wires, cable attachments and similar.

Permanent joints have an obvious disadvantage, since the members joined are deformed or damaged when the joint is removed. Previously known types of non-permanent couplings have also a disadvantage, since the attached members are more or less plastically and/or mechanically deformed when the joint is achieved. Said deformation causes the joint to be less resistent against vibrations and pressure and repeated assembly/disassembly can not be performed maintaining the desired properties of the joint.

The object of the present invention is to disclose an unknown development of a coupling of non-deformative type, based on the prior art previously known from Swedish Pat. No: 7201350-1 (Publication No: 372 607). Said patent discloses a coupling, in which a frusto-conical spring ring is twisted or tilted in relation to a tubular member, against which a peripherical portion of the spring ring is in contact. The spring ring acts as a force transforming means, said force being transferred by means of the tubular member to a member, intended to be attached by means of the coupling. Said previously known design includes thus as a primary and major element, the twistable or tiltable spring ring, arranged to transform the force executed by the movement of the force applying means to a holding force, acting against the peripherical portion of the tubular member.

To exclude the twistable or tiltable spring ring from the above mentioned previously known design, while maintaining desired force transformation, is obviously desired, since the design would be simplified and cheaper, and the risk for breakage to the spring would also be eliminated, e.g. caused by incorrect hardening of the spring ring.

An attempt to utilize a tubular member having an inwardly directed conical surface, intended to co-act with an outwardly directed conical surface of a second tubular member during a linear movement and to impose a force on said second tubular member, which is pressed against an embraced tubular means, intended to be attached, is shown in U.S. Pat. No. 2,640,716. The second tubular member is partly pressed into the embraced tubular means, thus plastically/mechanically deforming same. Said deformation, in connection with the conical surfaces of the members, prevents the joint from being disassembled, partly due to the deformation of the second tubular member which has been pressed into the tubular wall, partly due to the self-locking effect between the conical surfaces.

The object of the present invention is to disclose a previously unknown type of power transforming mechanism, intended to substitute mechanisms such as the previously described twistable or tiltable spring ring, which mechanism causes necessary power transformation and which also makes it possible to apply the holding force at a predetermined point against a contact means, having a beam-shaped longitudinal cross-section.

The important and characteristic features of the present invention are disclosed in the following main claim, and further characteristic features are also disclosed in the sub-claims.

The principles on which the present invention is based, as well as an example of an embodiment, is more fully described below with reference to the accompanying drawings.

BRIEF DESCRIPTION OF THE SEVERAL VIEWS OF THE DRAWINGS

FIG. 1 shows schematically the relationship between friction coefficient and applied force for obtaining similar holding properties.

FiG. 4 shows an alternative embodiment of the force transforming member.

FIG. 5 shows a further alternative embodiment of the force transforming member.

DETAILED DESCRIPTION

With reference to FIG. 1, the relationship between friction coefficient and applied force is shown, when certain predetermined holding properties are to be achieved. It can be seen, that with a friction coefficient in the range of 1.0, which in practise means a mechanical grip between the details, the necessary force to prevent a sliding action is relatively small. By increasing the contact surface, and by maintaining the same attachment force per surface unit, corresponding properties with regard to attachment can be achieved with a friction coefficient being less than 0.2. Obviously, the total applied force in the figure, indicated as a vertical line, would be considerably larger.

The present invention, which is based on a friction contact between the elements to be joined, is based on the fact, that friction attachment can be achieved also with a relatively small friction coefficient, provided that necessary force can be applied.

For this purpose, a force transforming mechanism is utilized, arranged to transform the linear movement of a force applying member 1, e.g. a nut, to a force transforming ring 2, arranged in contact with a holding member 3, which is arranged to take up frictional contact with the opposed peripherical portion against an element 4, intended to be attached. The holding member 3, having a beam-shaped longitudinal section, is referred to as the beam in the following specification.

Figure 2A:
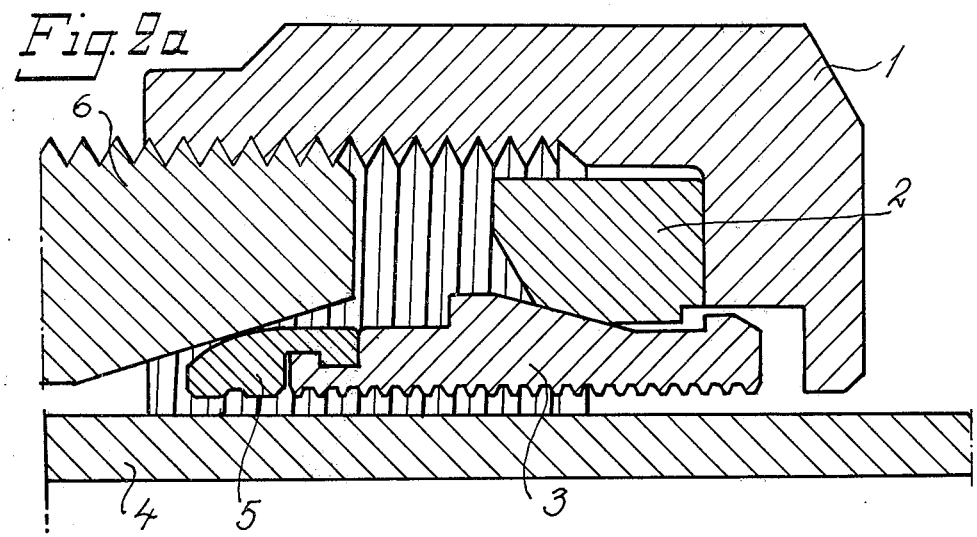
FIG. 2a shows an embodiment of a coupling according to the present invention, shown in uninfluenced position.
Figure 2B:
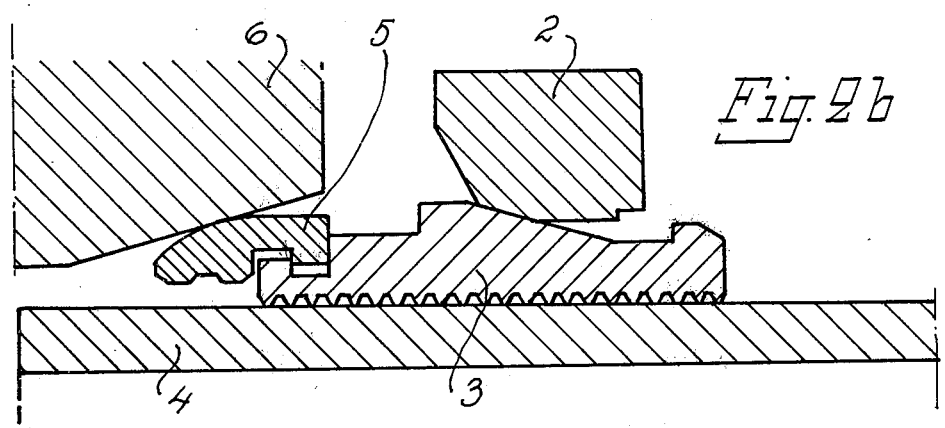
FIG. 2b shows the coupling according to FIG. 2a during a first stage of attachment, partly attached to a tubular member.
Figure 2C:
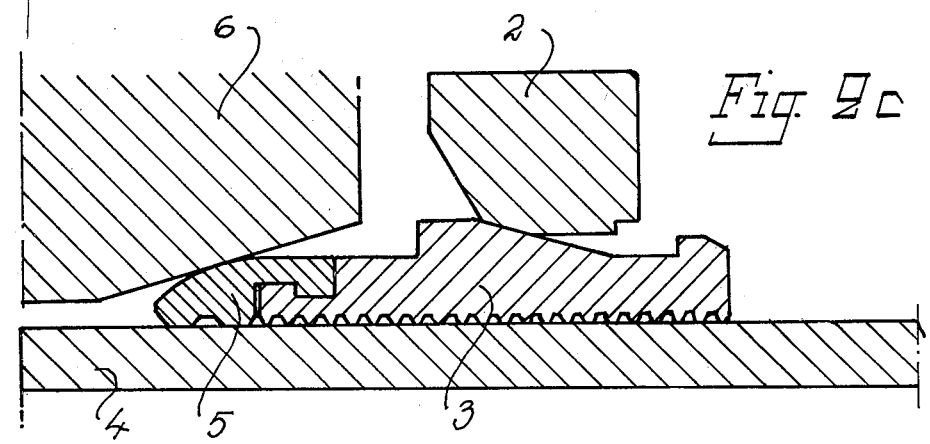
FIG. 2c shows the coupling according to FIGS. 2a and 2b in a completely applied position.

As shown in FIG. 2a–2c, the force transforming ring 2 can be manufactured as one unit, having a contact surface for the force applying member 1 extending mainly perpendicular to the length axis of the element 4. The force transforming ring 2 is further arranged with an inclined contact surface having a relatively restricted longitudinal extension, arranged to take up contact with an inclined surface at the beam 3, directed from the element 4.

In the shown embodiment the beam 3 is detachably joined with a nose portion 5, intended to cause sealing properties, but in the cases when sealing properties are desired, the nose portion 5 can also be arranged as an integrated part with the beam 3.

As shown in FIG. 2a, the beam 3 is arranged with grooves at the contact surface directed towards the element 4, whereby the attachment properties are improved, but such grooves are not necessary for all attachment cases.

By rotating the nut acting as a force applying member 1, an axial movement is achieved, which is transformed to the beam 3 via the force transforming ring 2, which is slightly moved up along the inclined surface of the beam 3. The beam 3, which is designed according to the stress calculation of a beam having a force applied at a predetermined point, is thus made subject to a force in one point in longitudinal direction, said applied force causing the beam 3 to take up contact with the element 4, the applied force being equally distributed per surface unit against the element 4 (cf FIG. 1). The desired large contact surface with an equally distributed applied force has thus been achieved.

Figure 3:
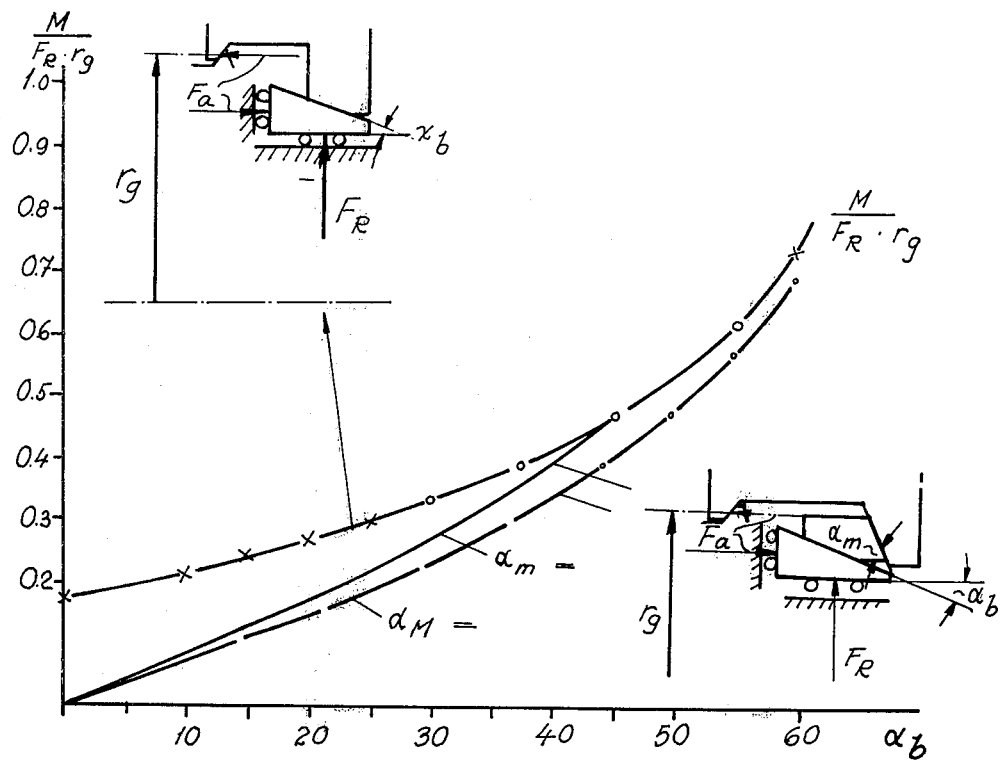
FIG. 3 shows two diagrams, intended to disclose the relationship between various angular relationships for the force transforming member and resulting torque.
Figure 3:
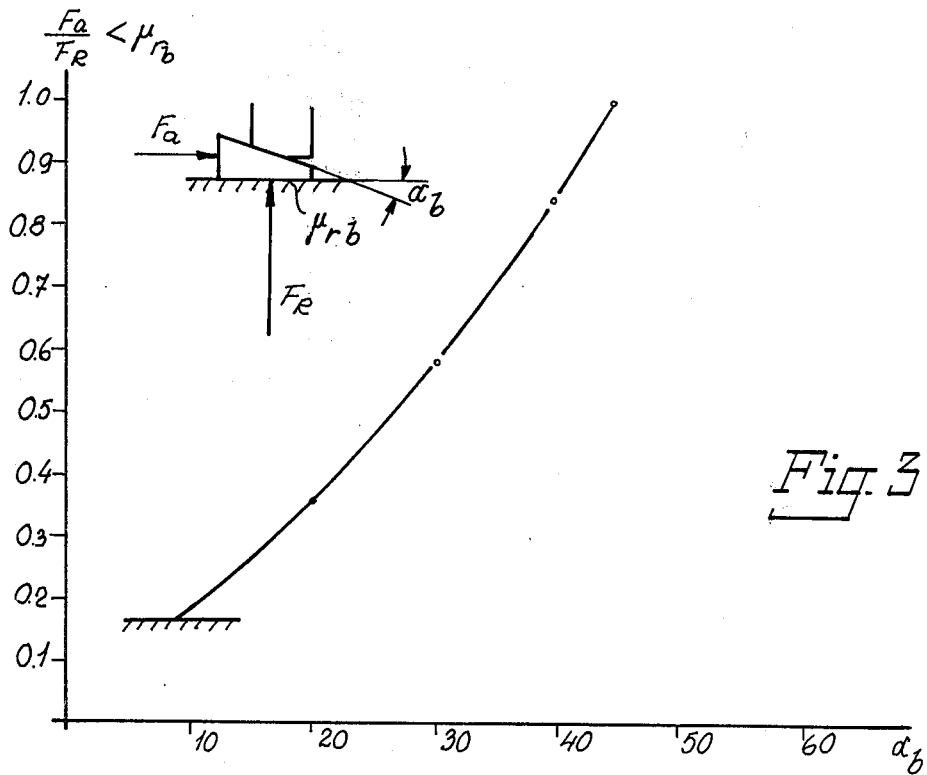

As shown in FIG. 3, the intermediate force transforming ring 2, which transforms the axial movement of the force applying member 1, will reduce the necessary torque for achieving desired attachment force.

The beam 3 is advantageously arranged with a through groove in longitudinal direction, whereby improved contact properties are achieved.

When not only holding properties are achieved, but also sealing properties are desired, e.g. at a tube joint, a nose member 5 is advantageously joined to the beam 3 as previously described. Said nose member 5 is arranged with a convex surface directed from the element 4, arranged to co-act with an inclined surface in the body 6 to which the force applying member 1 is attached. In order to achieve said sealing properties, the spring acting properties and the possibility to compress the material in the nose member 5 is also utilized.

In order to obtain an improved radial guidance of the force transforming ring 2 and related members, the force transforming ring 2 can advantageously be arranged with an inclined contact surface for the force applying member (the nut) 1, which is arranged with a correspondingly inclined contact surface. Two examples of such a design are shown in FIGS. 4 and 5. By utilizing a suitable angle, preferably exceeding 45° from the length axis of the attached element 4, an extremely small torque necessary for applying the force is maintained, and the guiding properties are considerably improved.

With regard to the embodiments including a sealing nose member 5, the contact surface against the attached element 4 is advantageously shaped as a combination of convex/concave surfaces, or, of plane surfaces, in longitudinal direction preferably separated from each other as at least two separate surfaces.

It should be emphasized, that the force transforming ring 2 according to the present invention, distinguished from previously known embodiments including two tubular members with co-acting conical surfaces, makes it possible to apply a relatively larger force to a restricted area in longitudinal direction. Hereby is a mainly equivalent force application achieved when compared with previously known twistable or tiltable spring rings, which ring also makes it possible to apply a force at a relatively restricted area in longitudinal direction.

The present invention is obviously not restricted to the above described and in the drawings shown embodiment, since obviously many modifications are possible, maintaining the important and characteristic features of the present invention.

I claim:

1. A frictional, non-deforming coupling for mechanically connecting an elongated element to a body without deforming the elongated element comprising, a contact member having the shape of a tubular sleeve embracing the element to be coupled, a slot through the wall of said contact member to allow said contact member to be diametrically reduced in size, a force transforming member surrounding said contact member for applying radially inward pressure against said contact member causing said contact member to grip against said element, said contact member and said force transforming member having complimentary interengaging tapered surfaces, the tapered surface of said force transforming member being axially shorter than the tapered surface of said contact member, and force applying means engaging said force transforming member for axially moving said force transforming member relative to said contact member with mutual sliding of said tapered surfaces from an unstressed position of said force transforming member relative to said contact member into a stressed position of said force transforming member relative to said contact member in which stressed position maximum radial force is applied to said contact member, the tapered surface of said force transforming member having a location on said tapered surface of said contact member when said members are in said stressed position in which the radial force trnasmitted to said contact member by said force transforming member is substantially evenly distributed axially along the length of said contact member, said force applying means having a screw thread cooperatively engagable with a mating screw thread on said body so that rotation of said force applying means when said screw threads are engaged will produce the coupling force.

2. The coupling as defined in claim 1 in which said force transforming member and said force applying means have complimentary force transmitting surfaces inclined relative to the direction of axial movement of said force transforming member.

3. The coupling as defined in claim 1 further comprising an annular shoulder on the outer surface of said contact member having a greater diameter than the inner surface of said force transforming member to retain said force transforming member on said contact member when the coupling is not in use, an annular nose-piece at one end of said contact member for forming a seal between said element to be coupled and said body adapted to be compressed between said one end of said contact member and said body.

4. The coupling as defined in claim 3, wherein said nose-piece has an inner surface for engaging said one element to be coupled and an annular groove in said inner surface.

* * * * *